United States Patent [19]

Robinson

[11] Patent Number: 4,610,106

[45] Date of Patent: Sep. 9, 1986

[54] GARDEN SPACE SAVER

[76] Inventor: Joseph M. Robinson, 158 Eaton St., Buffalo, N.Y. 14208

[21] Appl. No.: 737,182

[22] Filed: May 23, 1985

[51] Int. Cl.⁴ .............................................. A01G 17/06
[52] U.S. Cl. .......................................................... 47/45
[58] Field of Search ...................... 47/24–28, 47/30–32, 45–47, 48.5

[56] References Cited

U.S. PATENT DOCUMENTS

| 185,263 | 12/1876 | Sands | 47/45 |
| 377,444 | 2/1888 | Watrous | 47/45 |
| 2,822,644 | 2/1958 | Berger | 47/32 |
| 3,803,759 | 4/1974 | Heinecke | 47/27 |
| 4,099,344 | 7/1978 | Ruemeli | 47/31 X |
| 4,213,272 | 7/1980 | Nievelt | 47/45 |
| 4,357,884 | 11/1980 | Rast | 47/30 |

FOREIGN PATENT DOCUMENTS 673955  11/1964  Italy ........................................ 47/27

Primary Examiner—James R. Feyrer
Attorney, Agent, or Firm—Christel, Bean & Linihan

[57] ABSTRACT

An intensive gardening device for growing plants of a vine habit which provides a soil holding basin and a supporting pole supporting upwardly a spaced top element. The basin and the top element are provided with corresponding prongs having holes through which lines can be strung or tied to support vines growing from the basin. The basin may be anchored by a threaded basin anchor in one embodiment and by a support reservoir defining a pedestal in a second embodiment.

10 Claims, 6 Drawing Figures

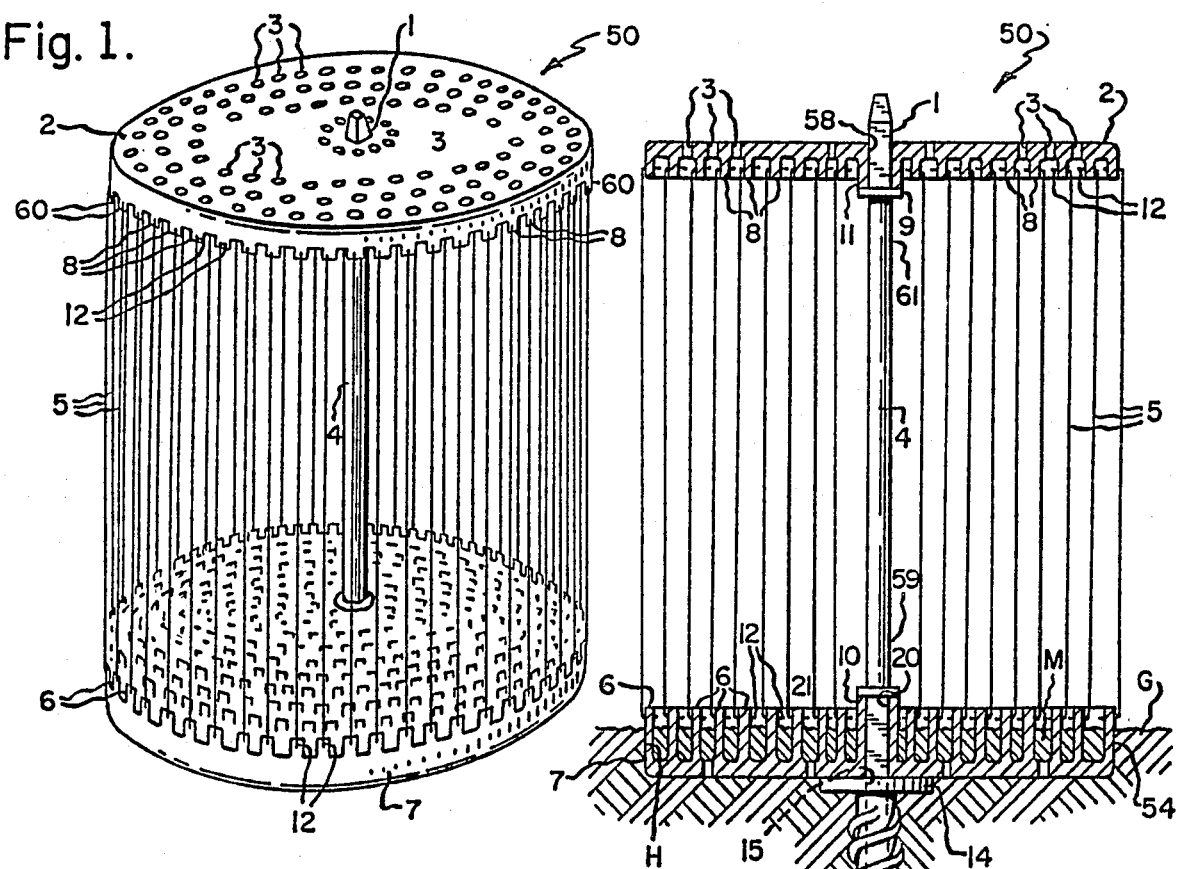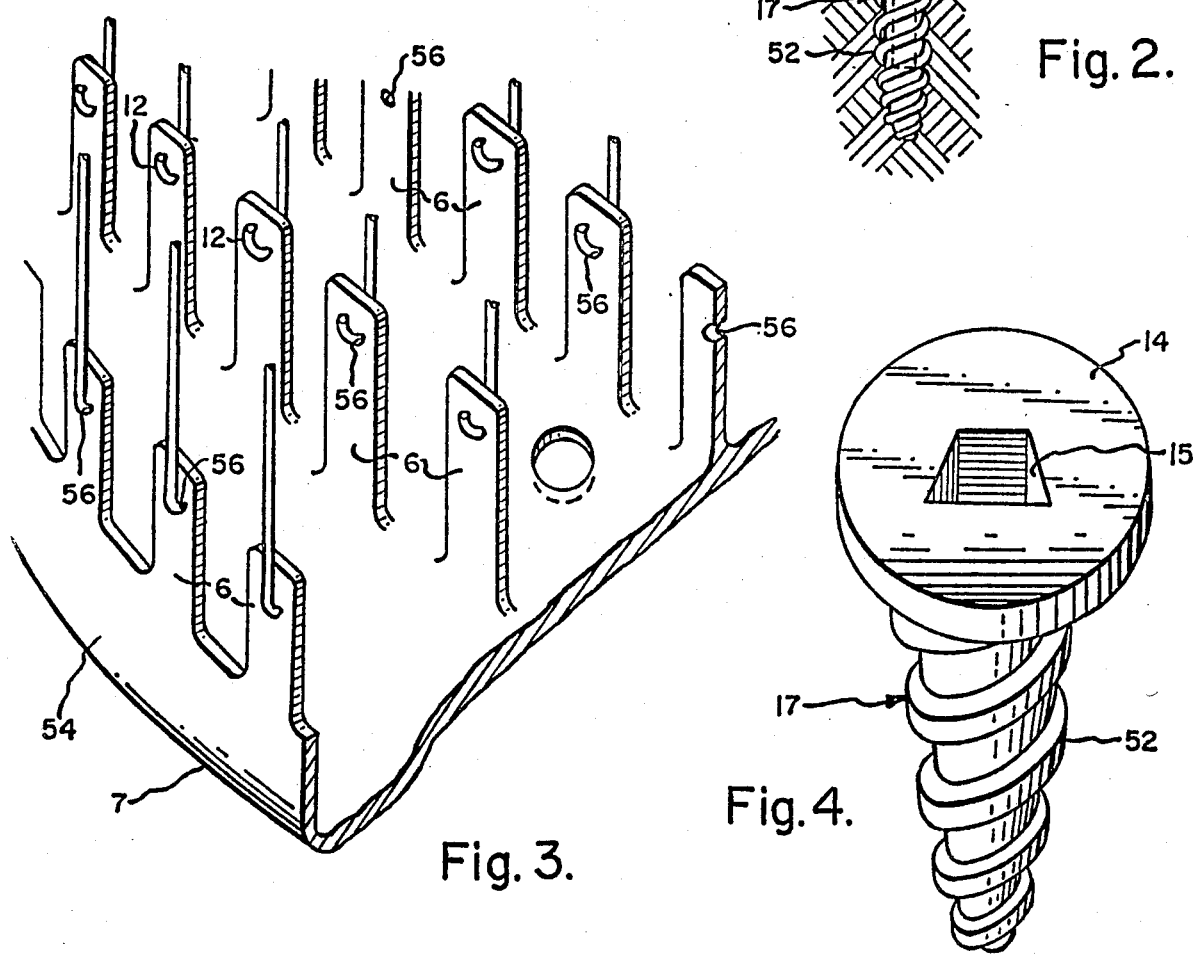

GARDEN SPACE SAVER

BACKGROUND AND SUMMARY OF THE INVENTION

This invention relates generally to the growing of vine-running vegetables or fruit-bearing plants on a farm or in a garden plot and relates more particularly to a unique vine branch guide system device that when properly erected and utilized will conserve farmland or garden plot space in producing.

For many years, much labor has been expended in tilling the soil with plows, pickaxes and the like and then planting seeds. It will be desirable to provide a device which facilitates the growing of vine-running vegetables or fruits for the farmer or gardner from the planting stage to the harvest stage.

Accordingly, it is an object of the present invention to provide a device facilitating the planting of seeds for vine-running vegetables or fruits, maintaining the crop, producing large plants, harvesting the product and increasing the crop harvest.

Another object is to provide such a device for conserving crop planting space for vine-running food bearing plants.

A further object is to provide such a device enabling a person harvesting the crop to gather vegetables or fruits from the vine with relative ease.

Still another object is to provide such a device that is economical to manufacture, efficient in use, rugged in structure, easy to assemble, and possess a relatively long working life.

These and other objects will become apparent from a reading of the following specification and claims together with the accompanying drawings.

The invention resides in a space saving device for the growing of vine-running vegetables or fruits.

The space saving device includes a basin for holding a soil medium, a supporting pole having one end associated with the basin, a top member associated with the end of the supporting pole opposite the basin, vine-supporting means and means for stabilizing the basin of the installation. The basin includes a central tubular portion having a square hole extending through its length for holding a lower end of the supporting pole and having a plurality of upstanding prongs. The supporting pole has spaced apart end portions of a square cross-sectional shape. The top member has a central tubular portion having a square hole extending through its length for receipt of one end of the supporting pole and including a number of depending prongs equal in number and location corresponding with the upstanding prongs of the basin. The vine-supporting means are connected between the upstanding prongs and the depending prongs for interconnecting at least a plurality of upstanding prongs with corresponding depending prongs for supporting prongs of vining plants. The means for stabilizing the basin includes a central hole of square cross section for receipt of the lower end of the supporting pole whereby the position of the installation can be fixed in a desired location.

BRIEF DESCRIPTION OF THE DRAWINGS FIGURES

FIG. 1 is a perspective view of an embodiment of the installation in accordance with the present invention.

FIG. 2 is a cross-sectional view taken about on lines 2—2 of FIG. 1.

FIG. 3 is a fragmentary perspective view of the FIG. 1 installation drawn to a slightly larger scale.

FIG. 4 is a perspective view of the ground screw of the installation.

DETAILED DESCRIPTION OF THE ILLUSTRATED EMBODIMENTS

Figure 5:
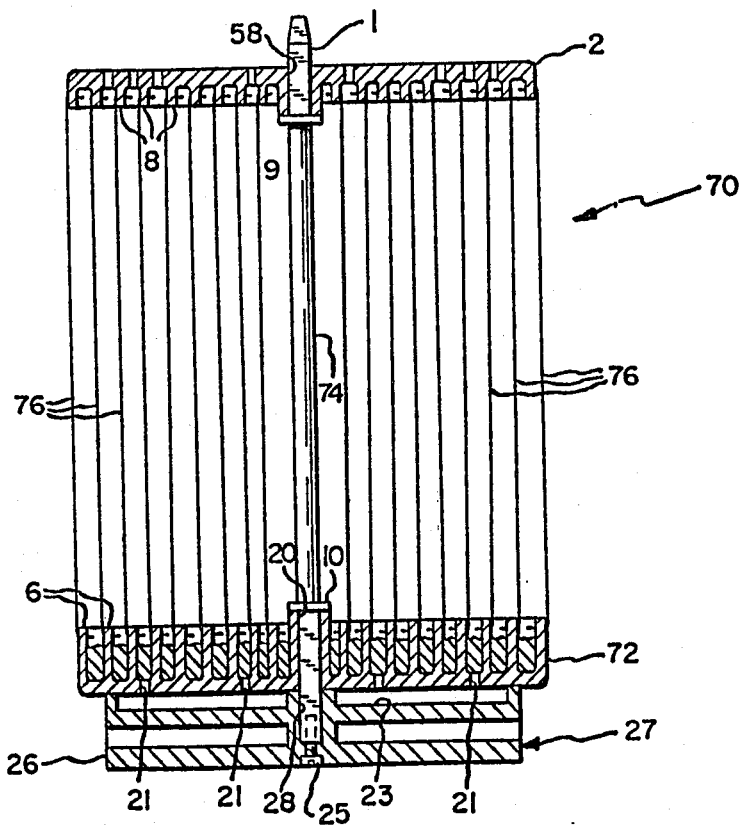
FIG. 5 is a view similar to that of FIG. 2 illustrating an alternative embodiment of the installation of this invention.

Turning now to the drawings in greater detail and considering first FIG. 1, there is shown an embodiment of a garden space saver device or installation in accordance with the present invention and generally indicated 50, and there is shown in FIG. 2 the installation 50 operatively positioned within the soil or ground G. The installation 50 includes a plastic basin 7 for holding a soil medium, a plastic top member 2, a support pole 4, a plurality of guidelines 5,5 and a ground screw 17 for vertically stabilizing the installation 50.

With reference to FIGS. 2 and 4, the ground screw 17 is constructed of plastic and includes a threaded shank 52 and a flat head 14. Collectively, the head 14 and shank 52 define a central hole 15 which extends from the head 14 for a length equal to about two-thirds the length of the screw 17. At best shown in FIG. 4, the central hole 15 is square in cross-section.

With reference to FIGS. 1-3, the basin 7 is generally circular in shape as viewed from above in FIG. 2 and includes a upstanding central collar 21 defining a square opening 20 defined centrally therein. When the basin 7 is utilized with the ground screw 17, the square opening 20 is aligned with the ground screw opening 15. The basin 7 also defines an upstanding rim 54 extending around the peripheral edge thereof, and the rim 54 and remainder of the basin 70 define a plurality of integral upstanding pins or prongs 6,6. As best shown in FIG. 1, the prongs 6,6 positioned within the rim 54 are arranged in generally concentric circles having a center located centrally of the basin 7. As best shown in FIG. 2, the height of the prongs 6,6 defined within the rim 54 are at least as high as the prongs 6,6 defined along the rim 54. For a reason which will be apparent hereinafter, each prong 6 or 6 defines a hole 56 in its free end.

With reference again to FIGS. 1 and 2, the support pole 4 defines a lower end portion 59 and an upper end portion 61. The lower end portion 59 defines a flange 10 and a bottom section extending from the flange 10 to the corresponding pole end and which is square in cross section. The bottom section of the lower end portion 59 is of such size as to be received by the aligned square holes 20 and 15. The upper end portion 60 defines a flange 9 and a top section extending from the flange 9 to the corresponding pole end. Positioned upon the aforesaid top section is a support spur 1 having a generally square outer cross section.

The top member 2 is generally circular in shape as viewed from above in FIG. 2 and includes a depending central collar 11 defining a hole 58 having a square cross section extending therethrough. The top member 2 further includes a plurality of depending prongs 8,8 equal in number and location corresponding with the upstanding prong 6,6 when operatively arranged above the base 7 and a plurality of vents or holes 3,3 for permitting moisture to travel through the top member 2. Each prong 8 defines an opening 60 at the end thereof a reason hereinafter apparent. It will be understood that the top member 2 of the device 50 is generally flat in shape with a centered square hole 58 and having the same number of prongs 8,8 as that of the basin 7. The depth of the top member 2 is a bit more shallow than that of the basin 7.

As shown in FIGS. 1 and 2, each guideline 5 or 5 is preferably constructed of a stretchable material having hooks 12,12 at opposite ends thereof and extends from a prong 8 in the top member 2 to a corresponding prong 6 in the basin 7. More specifically, each of the guideline hooks 12,12 is positioned within a corresponding hole 56 of a basin prong 6 or a corresponding hole 68 of a corresponding prong 8 in the top member 2.

To assemble and utilize the installation 50, a hole H is dug in the ground G for receiving the basin 7 as shown in FIG. 2. The ground screw 17 is then screwed into the ground by means of suitable tools until the flat head 14 is even with the bottom of the hole H and so as to provide an anchor for the installation 50. The basin 7, with its prongs 6,6 directed upwardly is then placed into the hole H and arranged so that its square opening 20 aligns with the ground screw hole 15, and the bottom section of the lower end portion 59 of the support pole 4 is then inserted through the aligned openings 20 and 15 until the flange 10 abuts the collar 21 and so that the pole 4 is supported upright. At that point, the top member 2, with its prongs 8,8 directed downwardly, is placed over the spur 1 atop the support pole 4 until the collar 11 abuts the pole flange 9. For planting purposes, a soil medium M, such as potting soil or dirt, is placed within the basin 7 so as to substantially fill the basin as shown in FIG. 2, and one or two seeds are deposited or planted within the soil medium M at the base or foot of each anchor prong 6 or 6. The basin 7 is then filled with dirt until the dirt within the basin 7 is about even with the surface of the surrounding ground G. Soon after the seeds have sprouted, the guidelines 5,5 are hooked between the prongs 8,8 of the top member 2 and the prongs 6,6 of the basin 7. It will be understood that the hooks 12,12 of each guideline 5 or 5 is connected to the prongs 6 and 8 which correspond to or directly oppose one another. For ease of assembly, it is recommended that the guide lines 5,5 be installed first between the innermost circle of prongs 6,6 and 8,8 and then installed systematically outwardly from the innermost circle of prongs 6,6 and 8,8.

For purposes of illustration, an illustrative device or installation 50 can have a basin 7 and top member 2 which are each about three feet in diameter; the prongs 6,6 or 8,8 can be arranged in twelve concentric circles within the corresponding top member or basin 7 so that each prong 6 or 8 is spaced about three inches from the adjacent prong 6 or 8 in the corresponding circle, and each inner circle is three inches smaller in diameter than the circle immediately outside the inner circle. The total number of prongs 6,6 or 8,8 can total one-hundred and fifty-eight in the corresponding basin 7 or top member 2; each prong 6 or 6 of the basin 7 can be about four inches high; and the support pole 4 can be about two inches thick and eight feet long.

The installation 50 of the invention is advantageous in that it saves space in growing vine-running crops. It is believed that the installation 50 having a basin 7 of the aforedescribed dimensions and number of prongs 6,6 and which requires about 9.4 square foot of ground area, when installed can be substituted for the ground area required to grow about 9.5 linear feet of crop. Thus, a large number of seeds can be planted in a small plot of soil with the installation 50. Furthermore, it is believed that the installation 50 requires less work in maintaining the crop and the harvesting of the product can be accomplished with relative ease. A further advantage of the installation 50 relates to the openings 3,3 defined in the top member 2. More specifically, the openings 3,3 permit rain to seep through and the drop down onto the soil covering the planted seeds.

A still further advantage provided by the installation 50 relates to the relative ease with which a harvesting of the crop is performed. Instead of being bent over for a great deal of the time in order to harvest the crop, the picker or one who manually harvests the crop moves between a bent-over position, a crouch position, and an upright upstanding position while reaching out and upward with his hand to grasp the crop product. It is believed that the installation 50 thus renders harvesting more pleasant to the worker that it would be if he were required to be bent over for a great deal of time.

A yet still another advantage provided by the installation 50 relates to the fact that the need for plowing in order to prepare the ground for planting is eliminated. Furthermore, it will be found that crops grown within the basin 7 require little or no weeding.

One more advantage provided by the installation 50 relates to the labor involved in planting of seeds. For example, whereas the planting of seeds in a linear row could require a great deal of walking on the part of a sower, a sower planting seeds in the installation 50 is required to walk very little. Similarly, one who subsequently harvests a crop grown in the installation 50 is required to walk very little.

Figure 6:
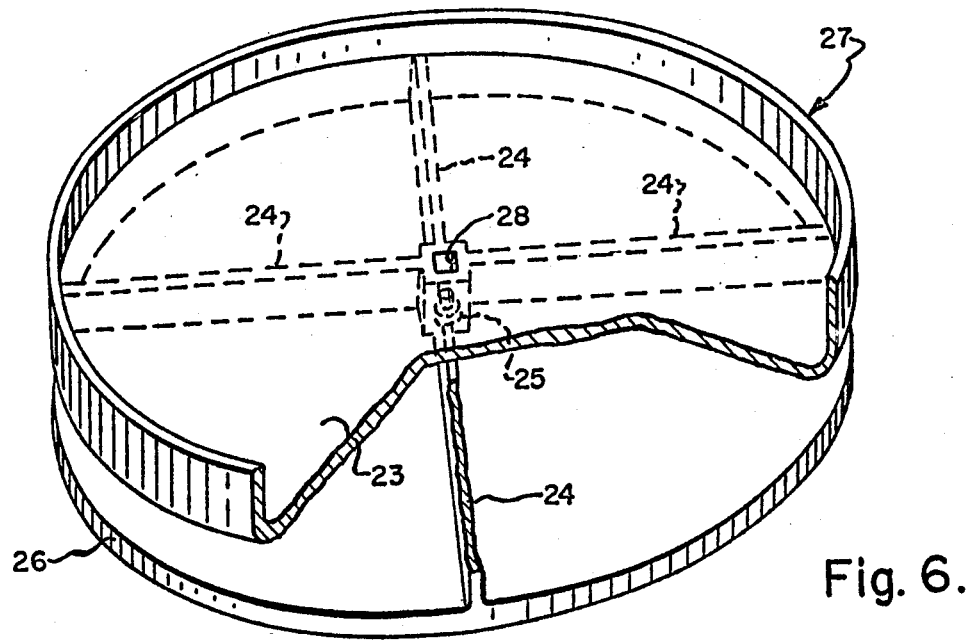
FIG. 6 is a perspective view, shown partially cutaway, of a portion of the FIG. 5 embodiment drawn to a slightly larger scale.

With reference to FIGS. 5 and 6, there is shown an alternative embodiment, generally indicated 70, of the installation of the invention. The installation 70 includes a basin 72, a reservoir basin 27, a support pole 74, a top member 2 and guide lines 76,76. Components and parts thereof which correspond to those of the installation 50 of FIGS. 1-4 are accordingly given the same reference numerals. The reservoir basin 27 is in the form of a wide circular floorstand having a pedestal formation 26 and a reservoir 23 and adapted to support the basin 72 in the manner shown in FIG. 5. A square aperture 28 is defined in the reservoir basin 27 for alignment with the hole 20 of the basin 72 to which is joined an aligned aperture for receiving the shank of a screwbolt 25, and the reservoir basin 27 includes four radially-outwardly extending arms 24,24 for stabilizing the installation 70. The basin 72 is identical in construction to that of the basin 7 of the installation 50 of FIGS. 1-4 except for the fact that the basin 72 defines a plurality of port holes 21,21 whereas the basin 7 does not. Furthermore, the support pole 74 defines an internally threaded aperture at the lower end thereof for receiving the screwbolt 25, and each of the support pole 74 and guide lines 76,76 are shorter in length than the support pole 4 and guide lines 5,5 of the installation 50 of FIGS. 1-4. As shown in the assembled condition of FIG. 5, the support pole 74 is supported in an erect position in the aperture 28 and held therein by means of the screwbolt 25 extending through the center of the pedestal 26 and tightened within the threaded aperture defined at the lower end of the support pole 74.

The reservoir 23 of the reservoir basin 27 collects any water expelled through the drainage port holes 21,21 of the ground holding basin 72. When the plant is watered by hand, the collection of water by the basin 27 is believed to duplicate the action as to what takes place when it rains in the open field in that the drainage openings 21,21 permit excess water to be expelled from the basin 72.

Whereas the installation 50 of FIG. 1–4 is envisioned as a field or commercial model and intended to be used in the open field, the installation 70 of FIG. 5 is envisioned as a house version suitable for use in a home, hot house, porch or greenhouse.

What is claimed is:

1. An installation for growing vining plants in a condensed area comprising:
    a basin for holding a soil medium, said basin including a central tubular portion, the tubular portion having a square hole extending through its length and having a plurality of upstanding prongs, said upstanding prongs including means for connecting vine supporting means therethrough;
    a supporting pole, said supporting pole having spaced apart end portions of a square shape in cross-section one of said end portions being a lower end portion supportedly held by said square hole of said basin;
    a top member having a central tubular portion, the central tubular portion defining a square hole extending through its length for receipt of the other end portion of said supporting pole and including a number of depending prongs equal in number and location corresponding with said upstanding prongs of said basin, said depending prongs including means for connecting vine supporting means therethrough;
    vine-supporting means interconnecting at least a plurality of said upstanding prongs with corresponding depending prongs for supporting vines of the vining plants,
    means for stabilizing the basin of said installation, said means for stabilizing the basin having a central hole of square cross-section for receipt of the lower end of said supporting pole whereby the position of said installation can be fixed in a desired location.

2. The installation of claim 1, wherein said basin includes a plurality of spaced drainage apertures.

3. the installation as defined in claim 1, wherein the top element includes a plurality of spaced apertures for the passage of liquid to said basin.

4. The installation of claim 1, wherein said means for stabilizing is in the form of a threaded screw which is threadably insertable into the soil to fix said installation into said desired location.

5. The installation of claim 2, wherein said means for stabilizing includes a reservoir basin underlying and attached to said basin for collecting liquid which seeps through said drainage apertures.

6. The installation of claim 1 wherein said basin, said supporting pole, and said top member are made of plastic material.

7. The installation of claim 1 wherein said basin and top member are circular in shape and the prongs of the basin and top member are arranged in concentric circles.

8. The installation of claim 7 wherein each prong defined is about three inches from its adjacent prong in its corresponding circle.

9. The installation of claim 7 wherein the diameter of each circle in the arrangement of concentric circles differs from an adjacent circle by about three inches.

10. The installation of claim 1 wherein said basin and top member are circular in shape and have a diameter of about three feet.

* * * * *